United States Patent [19]

Cheng

[11] Patent Number: 4,550,013
[45] Date of Patent: Oct. 29, 1985

[54] DECREASING CARBON BLACK REACTOR FOULING RATE

[75] Inventor: Paul J. Cheng, Bartlesville, Okla.

[73] Assignee: Phillips Petroleum Company, Bartlesville, Okla.

[21] Appl. No.: 414,288

[22] Filed: Sep. 3, 1982

Related U.S. Application Data

[62] Division of Ser. No. 281,754, Jul. 9, 1981, Pat. No. 4,371,511.

[51] Int. Cl.[4] .............................................. C09C 1/48
[52] U.S. Cl. .................................... 422/151; 422/150; 423/450; 423/456
[58] Field of Search ............... 422/150, 151, 156, 158, 422/157, 207; 423/450, 456

[56] References Cited

U.S. PATENT DOCUMENTS

| | | | |
|---|---|---|---|
| 2,971,822 | 2/1961 | Williams | 422/151 X |
| 3,376,111 | 4/1968 | Stegelman | 422/150 X |
| 3,497,324 | 2/1970 | Loewen | 422/150 X |
| 3,867,513 | 2/1975 | Krejci | 423/50 |
| 3,923,465 | 12/1975 | Krejci | 422/150 |
| 3,972,985 | 8/1976 | Sanelemente | . |
| 3,989,803 | 11/1976 | Henderson | . |
| 4,048,067 | 9/1977 | Cheng | . |
| 4,164,540 | 9/1979 | Slagel et al. | 422/158 |
| 4,360,497 | 11/1982 | Casperson | 422/156 |

Primary Examiner—Barry S. Richman
Assistant Examiner—William R. Johnson
Attorney, Agent, or Firm—John R. Casperson

[57] ABSTRACT

Feed oils are injected axially into a carbon black reactor in a manner which slows buildup of deposits in the reactor. This is accomplished utilizing a nozzle configuration for injecting the feed oil into the carbon black reactor so that deposit-forming contaminants are directed away from the walls of the reactor. In one aspect, the feed oil is separated into two streams, one stream is contaminant-rich and the other is substantially contaminant-free. The contaminant-rich stream is fed into the reactor surrounded by the substantially contaminant-free stream. In another embodiment, a feed nozzle for a carbon black reactor is formed by a first feed tube surrounded coaxially by a second feed tube. The first feed tube can be utilized to inject contaminant-rich feed oil into the reactor. The second feed tube can be utilized to inject contaminant-free oil into the reactor in a manner such that it surrounds the contaminant-rich stream. In an embodiment, one or more nozzles is provided at the outlet ends of the feed tubes for advantageous spray of feedstock.

4 Claims, 9 Drawing Figures

DECREASING CARBON BLACK REACTOR FOULING RATE

This application is a division of application Ser. No. 281,754, filed July 9, 1981, now U.S. Pat. No. 4,371,511.

This invention relates to the production of carbon black. In one aspect, the invention relates to increasing the operating life of a carbon reactor by decreasing the rate at which deposits are formed in the reactor.

BACKGROUND OF THE INVENTION

Carbon black is conventionally produced by decomposing an oil. Typically, a feed oil is heated in a ceramic lined reactor by hot combustion gases which contact the oil either tangentially or coaxially. The reaction is generally controlled or terminated by injecting a quench fluid at a predetermined location along a cylindrical reaction zone.

Carbon black reactor feed oils often contain contaminants. When heated at high carbon black reaction temperatures, these contaminants form undesired compact masses. The masses which contact the reactor walls tend to deposit there. Buildup of such deposits fouls the reactor internals to such a degree that the reaction must be stopped and the reactor disassembled and cleaned. Thus, the fouling results in a loss of reactor efficiency and causes increased carbon black production costs.

THE INVENTION

It is thus one object of this invention to reduce the fouling rate of carbon black reactors.

Another object of this invention is to inject a feed oil into carbon black reactors in a manner which would decrease buildup of deposits in the reactors.

A still further object of this invention is to provide a nozzle configuration for injecting feed oil into carbon black reactors that will direct deposit forming contaminants away from the walls of the reactors.

These and other objects, advantages, details, features, and embodiments of this invention will become apparent to those skilled in the art from the following detailed description of the invention, the appended claims, and the drawings in which, FIG. 1 shows a carbon black reaction system utilizing feed oil separation of the present invention.

Figure 1:
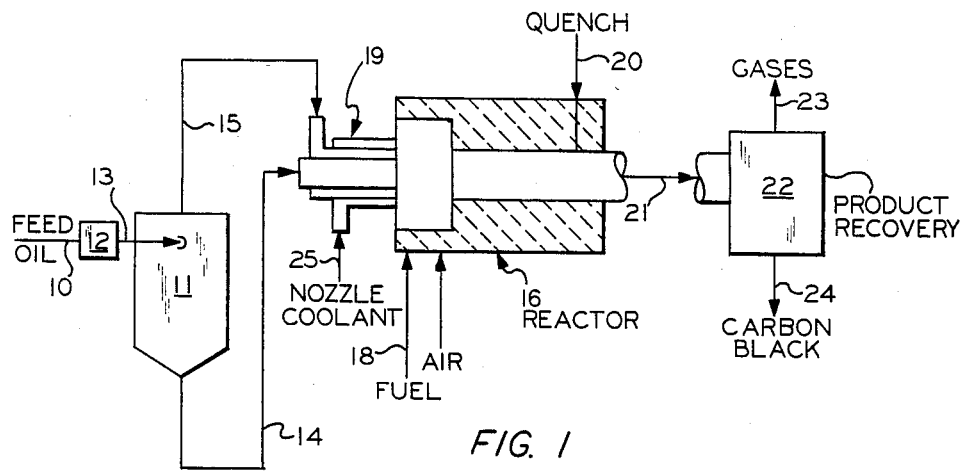

In accordance with this invention, the fouling rate of a carbon black reactor can be reduced by manipulating the feed oil. The feed oil is separated into two streams. One stream is contaminant rich, and the other is substantially contaminant free. The contaminant rich stream is fed into the reactor surrounded by the substantially contaminant free stream. The contaminant free stream is closest to the reactor walls. The combustion gases of the reactor contact the contaminant free stream prior to contacting the contaminant rich stream. Thus, this invention reduces contact between the reactor walls and the undesired compact masses derived from contaminants. The undesired masses then do not become deposits which foul the reactor walls.

The terms, combustion gases and hot combustion gases, as used in the specification and claims, include gases derived from the heating or combustion of a separate fuel and/or a portion of the feed oil streams with a free oxygen containing gas such as air.

In one embodiment of this invention, a stream of feed oil is first heated in heat exchange equipment. The feed oil is selected from petroleum oils or synthetic oils fom coal or shales. The feed oil contains a contaminant such as a catalyst, an inorganic ash, and/or a solid carbonaceous material which when reacted with hot combustion gases in the reactor reaction zone will form deposits in the reactor. The heat exchange equipment used to heat the feed oil can be shell and tube heat exchangers, evaporators, etc. The heating of the oil facilitates subsequent separation of contaminants from the oil. The warm oil is passed from the heat exchange equipment through a separation device. The device can be a centrifuge, cyclone liquid-solid separator, etc. The warm oil stream is separated into a contaminant rich stream and a substantially contaminant free stream (hereinafter referred to as the contaminant free stream). Each stream is directed by separate conduits to a carbon black reactor feed nozzle configuration. This nozzle feeds the contaminant rich stream into the reactor near the center of the reaction zone and preferably in an axial direction. The nozzle directs the contaminant free stream into the reaction zone in such manner that it surrounds the contaminant rich stream. The contaminant free stream acts like an envelope to surround the contaminant rich stream. This flow configuration effectively prevents the contaminant rich stream from touching the reactor walls. The two streams at least in area proximate to the respective injection nozzles flow approximately in parallel with the contaminant depleted oil stream surrounding the contaminant rich oil stream.

In another embodiment of this invention, a reactor feed nozzle which is used to feed two separate feed oil streams into a carbon black reactor comprises a first feed tube surrounded coaxially by a second feed tube. The first and second feed tubes are surrounded coaxially by another tube or other tubes which provide nozzle coolant means of air, water, etc. The first feed tube injects contaminant rich feed oil axially into the reactor preferably near the center of the reaction zone. The second feed tube injects the contaminant free oil stream into the reactor in such manner that it surrounds the contaminant rich stream. In one variation of this embodiment, a near circular, ring shaped, flat plate is fitted around the exterior of the first tube and within the interior of the second tube near the end of the second tube. This plate is perforated and has more than one aperture suitable for passing feed oil streams. The plate splits the contaminant free stream in the second feed tube into as many different streams as the plate has apertures surrounding the first feed tube. In another variation of this embodiment, the apertures of this plate are fitted with spray nozzles. These nozzles shape and guide the oil flow in a desired pattern into a desired location in the reaction zone. The spray nozzle spray patterns can be cone shaped, pyramidal, cylindrical, etc. In a preferred variation, the spray pattern is cone shaped having a cone half angle in the range of about 0° to about 45°. In still another variation of this embodiment, the interior of the first tube is fitted with a plate. This plate is located near the point in the reactor where the first feed tube opens into the reactor. The plate is perforated and has more than one aperture suitable for passing feed oil. The contaminant rich feed oil stream to the first feed tube is separated by the openings in the plate into more than one flow. This arrangement allows the contaminant rich stream to be separated into a desired number of flows which can be easily surrounded by contaminant free oil streams. In a still more preferred variation of this embodiment, spray nozzles are fitted to the apertures of the plate within the first feed tube. These spray nozzles shape the contaminated oil into a desired pattern. This pattern can be cone shaped, pyramidal, cylindrical, etc. A solid pattern is one with a near cylindrical flow having only a slight cone shape with a cone half angle in the range of about 0° (solid spray) to 10°. The solid spray pattern is preferred for nozzles injecting contaminant rich streams into the reaction zone. The stream is directed toward the center of the reaction zone rather than toward the reactor walls. In other variations of this embodiment, a plate within the second feed tube having spray nozzles fitted thereto is used in conjunction with a plate within the first feed tube having spray nozzles fitted thereto. The spray patterns from nozzles on both plates from the different feed oil streams are set so that the contaminant rich stream is encircled by the contaminant free stream. Also, the number of apertures in the plate and the number, arrangement, and spray patterns of spray nozzles on the various plates may be varied with carbon black reactor size, feed oil rate, and reactor type.

FIG. 1 shows a carbon black reaction system utilizing feed oil separation of the present invention. A contaminated feed oil in conduit 10 is directed through a stream pretreatment device 12, such as a heat exchanger or an evaporator, which preconditions the feed oil. The conditioned feed oil in conduit 13 passes to a separation means 11. The separation means 11 can be any device known in the art for separating dense matter from a liquid, including but not limited to filters, centrifuges, strainers, liquid cyclones, thickeners, evaporators, etc. The separation means 11 separates the feed oil into at least two streams. In FIG. 1, in the illustrated embodiment of this invention, a contaminant rich feed oil stream 14 and a substantially contaminant free stream 15 pass from a separation means 11. These are directed to the reactor 16 by a feed nozzle system 19, having a cooling means 25. The separate streams are introduced into the reactor 16 in such manner that the contaminamt free stream 15 substantially surrounds the contaminant rich stream 14. Both streams are reacted with hot combustion gases derived from air 17 and fuel 18. The reaction is controlled or terminated by quench fluids 20. The combined reactor effluent passes via a conduit 21 to a product recovery system 22 where excess gases 23 are vented and carbon black product 24 is recovered.

Figure 2:
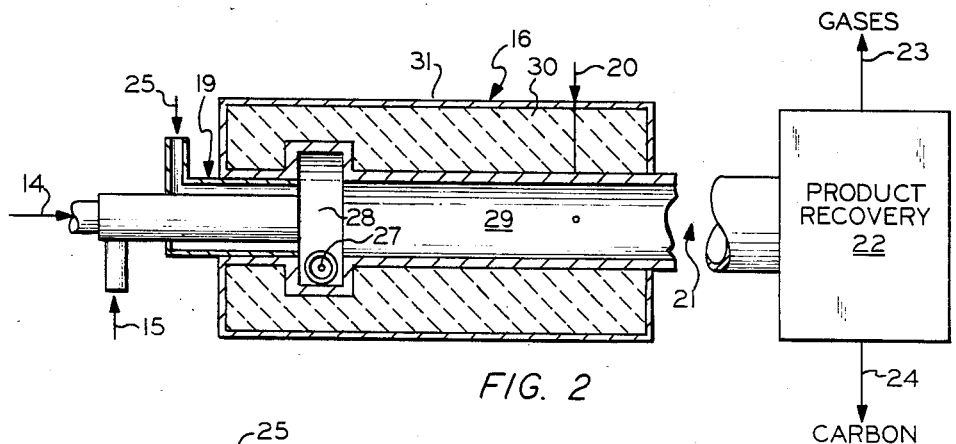
FIG. 2 shows a tangential carbon black reactor having a nozzle suitable for feeding split feed oil streams of the present invention.

FIG. 2 illustrates a typical tangential carbon black reactor system utilizing segregated feed oil flows of the present invention. The reactor 16 has a refractory lined combustion chamber 28 and reaction zone 29, surrounded by insulation 30 and a metal shell 31. Provision is made for reaction quench 20 and product recovery 22. Air and fuel are typically injected through a tube 27 tangentially into a near circular combustion chamber 28 where they are ignited to produce hot combustion gases. The gases spiral around the combustion chamber 28 as they contact and react with feed oil streams 14 and 15 injected via the nozzle system 19. The feed nozzle system 19 typically has a coolant 25 such as air.

Figure 3:
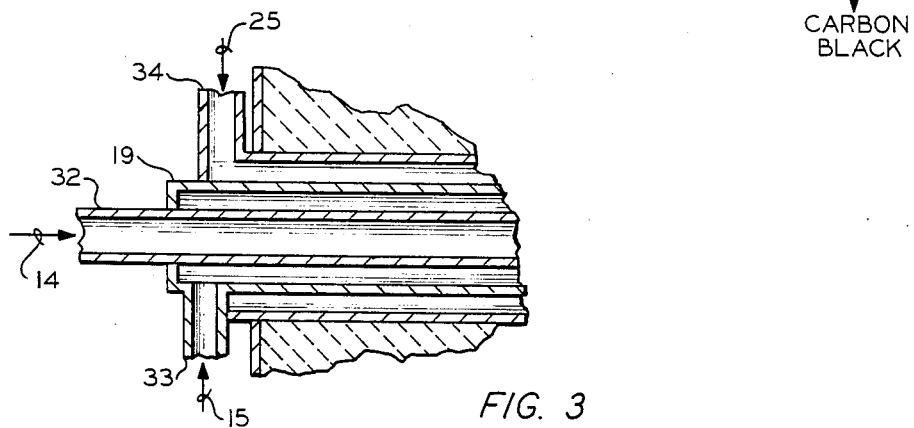
FIG. 3 shows a feed oil feed nozzle arrangement for injecting split feed oil streams into a tangential reactor.

FIG. 3 illustrates one type of nozzle configuration 19 suitable for injecting split feed oil streams into a tantential reactor similar to that of FIG. 2. Such a nozzle system comprises a conduit 32 for injecting a contaminant rich stream 14 surrounded coaxially by a conduit 33 for injecting contaminant free stream 15. The nozzle coolant stream 25 is supplied via a separate conduit 34.

Figure 4:
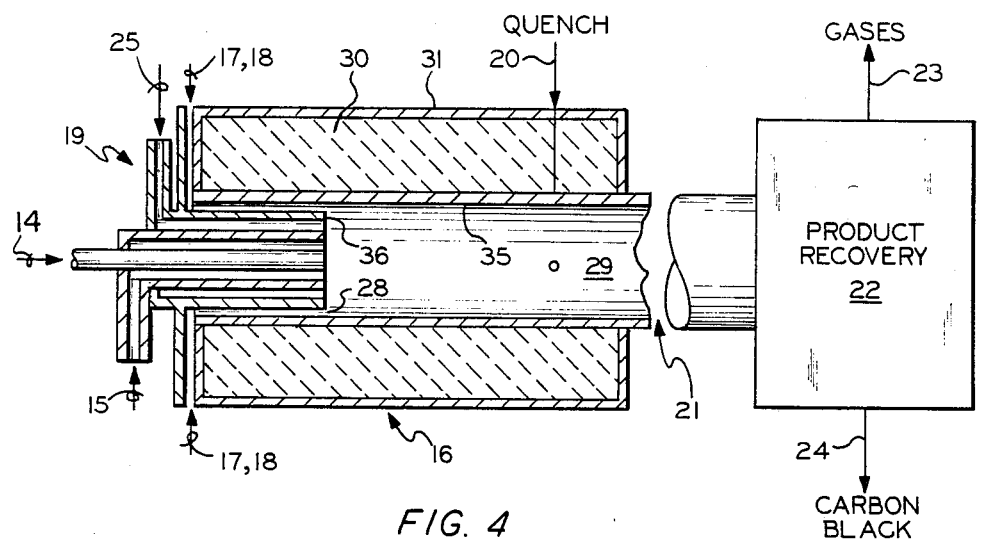
FIG. 4 shows a coaxial carbon black reactor utilizing split feed oil streams of the present invention.

FIG. 4 illustrates a typical coaxial or furnace type carbon black reactor 16 utilizing split feed oil streams of the present invention. The reactor 16, like the tangential reactor, of FIG. 2, has a refractory lined combustion chamber 28 and reaction zone 29, surrounded by insulation 30 and a metal shell 31. Provision is likewise made for reaction quench 20 and product recovery 22. Air 17 and fuel 18 are typically injected by means of a circular distribution ring (not shown) into a circular combustion chamber 28 formed by the gap between reactor internal shell 35 and the feed nozzle system 19 outer periphery 36. The combustion gases produced travel along the feed nozzle system 19 outer periphery 36. These gases contact the feed oil streams 14 and 15 ejected from the feed nozzle system 19.

Figure 5:
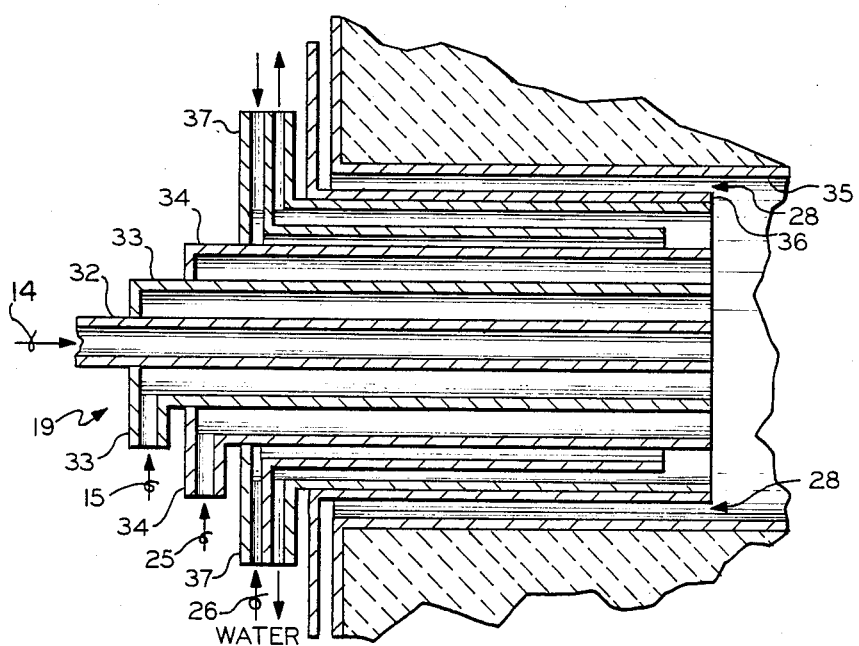
FIG. 5 shows a feed oil feed nozzle arrangement for injecting split feed oil streams into a coaxial reactor.

FIG. 5 illustrates one type of nozzle configuration 19 suitable for injecting split feed oil streams into a coaxial or furnace type carbon black reactor similar to that of FIG. 4. Such a nozzle system comprises a conduit 32 for injecting a contaminant rich stream 14 surrounded coaxially by conduit 33 for injecting a contaminant free stream 15. A nozzle coolant stream 25 utilizing air or other gas supplied via a separate conduit 34. In addition, a liquid coolant stream 26 such as water is frequently flowed in a conduit system 37 to provide additional cooling since the nozzle system 19 extends into or is a part of combustion chamber 28.

Figure 6:
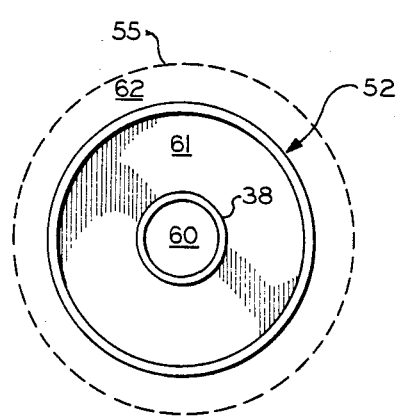
FIG. 6 shows a feed oil nozzle having a first feed tube surrounded coaxially by a second feed tube.

FIG. 6 is a frontal view of a basic feed oil nozzle configuration of the present invention. A feed oil tube 38 forms a circular space 60 from which the reactor 16 is fed a contaminant rich stream 14. A second feed oil tube 52 forms a circular space 61 and surrounds the first tube 38. This second tube 52 is used to feed the substantially contaminant free stream 15. Additional tubes 55 surround the second tube 52 providing annular spaces 62 used for injecting cooling mediums such as air. Additional tubes and annular spaces, and apparatus can be provided for various other cooling mediums such as water, depending on the reactor type or design.

Figure 7:
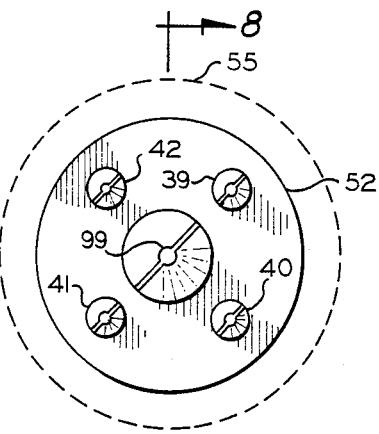
FIG. 7 shows a carbon black reactor feed nozzle arrangement wherein a perforated plate, having spray nozzles on the plate aperatures, is fitted to the interior of one feed tube.
Figure 8:
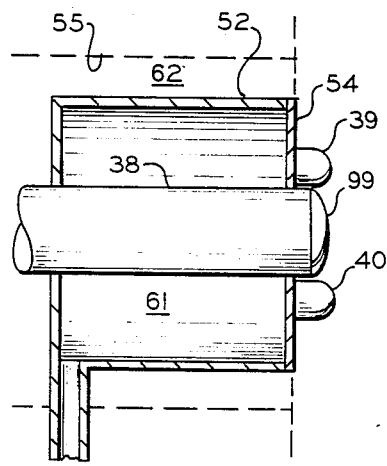
FIG. 8 is a side view of the apparatus of FIG. 7.
Figure 9:
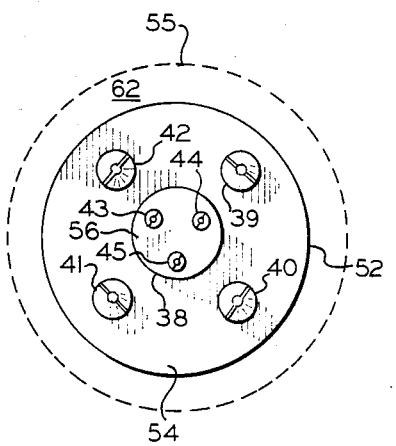
FIG. 9 shows another carbon black reactor feed nozzle arrangement.

In FIG. 7 and FIG. 8, a perforated plate 54 covers the annular space 61 formed by the second feed tube 52 and the first feed tube 38. Spray nozzles 39, 40, 41, and 42 are affixed to the plate 54. In FIG. 7, the contaminant rich stream 14 is ejected from a spray nozzle 99. The contaminant free stream 15 is ejected from nozzles 39, 40, 41, and 42. Spray nozzle 99 is designed to have a spray forming a cone pattern with a cone half angle in the range of about 0° (solid pattern) to about 10°. Each of the spray nozzles 39, 40, 41, and 42 are designed to have a spray forming a cone pattern for the individual nozzle with a cone half angle in the range of about 0° to 75°. In a preferred embodiment, the cone half angle of nozzle 99 is 0°, yielding a near circular, solid spray pattern, and the individual nozzle cone half angle of nozzles 39, 40, 41, and 42 are 45°. The contaminant rich stream 14 can be fed into the reactor via more than one centrally located spray nozzle. FIG. 9 illustrates such a configuration, wherein spray nozzles 43, 44, and 45 are affixed to a plate 56, and these spray nozzles feed contaminant rich stream 14 into the reactor. Each of these spray nozzles would have a spray forming an individual nozzle spray cone pattern having a cone half angle in the range of about 0° (solid spray) to about 10°. Spray nozzles 39, 40, 41, and 42 on plate 54 are contaminant free stream 15 feed nozzles.

Those skilled in the art will see many modifications which can be made in the above process and apparatus. For example, the number and arrangement of feed nozzles can be changed. Nozzles 39, 40, 41, and 42 and nozzles 43, 44, and 45 can include other nozzles. Also those skilled in the art realize that nozzle spray angles may be modified to obtain an optimum spray pattern for reactors of different types, sizes and operating conditions. Therefore, reasonable variations and modifications which will become apparent to those skilled in the art can be made in this invention without departing from the spirit and scope thereof.

What is claimed is:

1. An apparatus for feeding oil into a carbon black reactor for the purpose of decreasing the fouling rate within the carbon black reactor, said apparatus comprising
   (a) a first feed oil tube;
   (b) a means for supplying a contaminant-rich oil into the first feed oil tube;
   (c) a second feed oil tube surrounding and having the same axis as said first feed oil tube;
   (d) a means for supplying a contaminant-poor oil into the second feed oil tube;
   (e) a circular first multiply perforated plate having an overall diameter substantially equal in value to the external diameter of said second feed oil tube and having a centrally located perforation with a diameter substantially equal in value to the external diameter of said first feed oil tube fitted around said first feed oil tube and fitted to said second feed oil tube;
   (f) a plurality of spray nozzles fitted to the noncentrally located perforations of said multiply perforated plate; and
   (g) a tube or tubes for cooling mediums, said tube or tubes being coaxial with and surrounding said second feed oil tube.

2. An apparatus as in claim 1 further comprising a second circular multiply perforated plate having an overall diameter which is equal in value to the internal diameter of the first feed oil tube, said second multiply perforated plate fitted to said first feed oil tube.

3. An apparatus as in claim 2 further comprising a second plurality of spray nozzles, said second plurality of spray nozzles being fitted to the perforations in the second multiply perforated plate.

4. An apparatus as in claim 3 wherein each of the spray nozzles fitted to the first multiply perforated plate have a spray pattern with a cone half angle in the range of from about 0° to about 75° and each of the spray nozzles fitted to the second circular multiply perforated plate have a cone spray pattern with a cone half angle in the range of from about 0° to about 10°.

* * * * *